United States Patent [19]

Carson

[11] Patent Number: 4,930,250

[45] Date of Patent: Jun. 5, 1990

[54] TROTLINE STORAGE REEL

[76] Inventor: Raymond M. Carson, Rte. 1, Box 4, Faxon, Okla. 73540

[21] Appl. No.: 402,452

[22] Filed: Sep. 5, 1989

[51] Int. Cl.⁵ .............................................. A01K 97/00
[52] U.S. Cl. .............................................................. 43/57.3
[58] Field of Search ................... 43/4, 27.4, 57.2, 57.3

[56] References Cited

U.S. PATENT DOCUMENTS

| | | | |
|---|---|---|---|
| 2,041,322 | 5/1936 | Cantini | 43/57.3 |
| 2,629,197 | 2/1953 | Duvall | 43/57.3 |
| 2,702,442 | 2/1955 | Wallen | 43/57.3 |
| 4,453,843 | 6/1984 | Martyniuk | 43/57.3 |

FOREIGN PATENT DOCUMENTS

| | | | |
|---|---|---|---|
| 66809 | 9/1943 | Norway | 43/57.3 |
| 57415 | 9/1924 | Sweden | 43/57.3 |

*Primary Examiner*—M. Jordan

*Attorney, Agent, or Firm*—Fleit, Jacobson, Cohn, Price, Holman & Stern

[57] ABSTRACT

A trotline storage reel on which a trotline with attached hook leader lines and hooks assembled thereon can be wound onto and stored conveniently on a reel and subsequently unwound from the reel from a boat or the like in order to facilitate storage of a trotline, positioning a trotline in a fishing relationship to a body of water and retrieving the trotline. The trotline storage reel includes a reel device with a hub and spaced discs with at least one of the discs including a plurality of radially disposed cages or retainers for the trotline hooks to retain them in position and prevent them from becoming entangled with the trotline or hook leader lines. The reel is inexpensive to manufacture inasmuch as it can be made from plastic or similar material and is effective for winding, storing and placing a trotline in fishing position.

8 Claims, 1 Drawing Sheet

TROTLINE STORAGE REEL

BACKGROUND OF THE INVENTION

FIELD OF THE INVENTION

The present invention generally relates to a trotline storage reel on which a trotline with attached hook leader lines and hooks assembled thereon can be wound and stored conveniently and subsequently unwound from the reel from a boat or the like in order to facilitate storage of a trotline, positioning a trotline in a fishing relationship to a body of water and retrieving the trotline. The trotline storage reel includes a reel device with a hub and spaced discs with at least one of the discs including a plurality of radially disposed cages or retainers for the trotline hooks to retain them in position and prevent them from becoming entangled with the trotline or hook leader lines. The reel is inexpensive to manufacture inasmuch as it can be made from plastic or similar material and is effective for winding, storing and placing a trotline in fishing position.

INFORMATION DISCLOSURE STATEMENT

Trotlines are used frequently for various fishing operations and have always had the problem of becoming entangled when stored and not in use. In view of this problem, efforts have been made to provide devices for storing trotlines so that they can be placed in fishing position without the trotline, droplines or leader lines and hooks becoming entangled. The following U.S. patents relate to trotline storage devices: U.S. Pat. Nos.
   2,242,509
   3,629,197
   3,660,924
   3,832,798
   4,525,949

While these patents disclose trotline storage devices, none of them disclose the specific reel structure, hook cages and related structural features of the present invention.

SUMMARY OF THE INVENTION

An object of the present invention is to provide a trotline storage reel that is very easy and simple to use and relatively inexpensive to manufacture inasmuch as it can be constructed of plastic or similar material thus enabling the line and hooks to be thoroughly washed when on the reel with no adverse effects with the reel including a hub on which the trotline is wound having a pair of discs mounted thereon with at least one of the discs including a plurality of peripheral notches or slots and the side of the disc opposite the hub includes a plurality of radially disposed cages or receivers for retaining the hooks therein to preclude the hooks from becoming entangled with the trotline and leader lines.

Another object of the invention is to provide a trotline storage reel which can be double-sided or single-sided and includes a hub rotatably journalled on a shaft or pipe forming a handle to support the reel to enable manual rotation to wind the dropline on the reel with the leader lines extending through peripheral notches in the discs and the hooks on the ends of the leader lines positioned in the cages with each of the cages including a slot receiving the leader line to retain the leader line in position and retain the hook in the cages with the unwinding of the trotline enabling the leader lines to be removed from the notches in the disc and the slots in the cages thus permitting the hooks to fall free of the cages as the trotline is unwound from the reel.

A further object of the present invention is to provide a trotline storage reel in accordance with the preceding objects in which the cages ca be used to store fishhooks in other orientations such as on a fishing rod to safely retain the hook from becoming entangled and causing injury.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
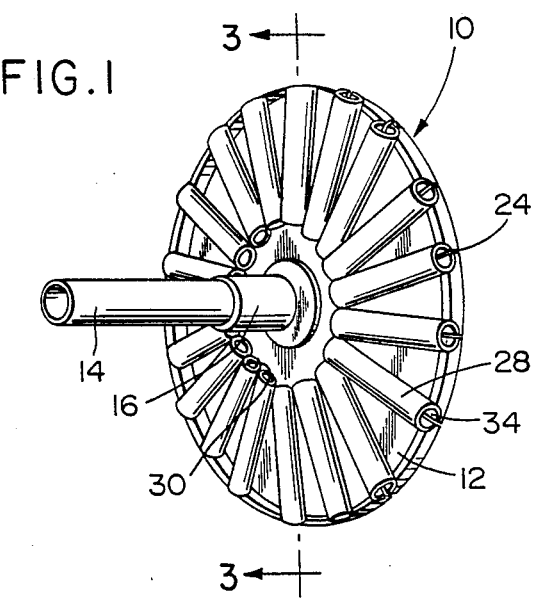
FIG. 1 is a perspective view of the trotline storage reel of the present invention illustrating the handle side of the reel.

Referring now specifically to the drawings, the trotline storage reel of the present invention is generally designated by reference numeral 10 and includes a circular disc 12 mounted rotatably on a centrally disposed shaft or pipe 14 which forms a handle for the trotline storage reel. The disc 12 is rigidly affixed to or unitary with a central tubular hub 16 which is rotatably mounted on shaft 14 and extends from both sides of the center of the disc and is rigid therewith. A smaller retaining disc 18 is removably mounted on the hub 16 and is spaced from disc 12. The distance between the disc 12 and disc 18 is determined by a spacer 20 which removably fits on the hub 16 and can be interchanged with spacers of different lengths to vary the distance between the discs. A trotline 22 is wound on the hub 16 and spacer 20 along with the leader lines 24 which extend radially outwardly and are received in radial notches 26 in the peripheral edge of disc 12 with the notches 26 being spaced around the circumference of the disc 12 and forming a structure for receiving the leader lines or droplines 24 that are attached to the main line or trotline 22.

Figure 3:
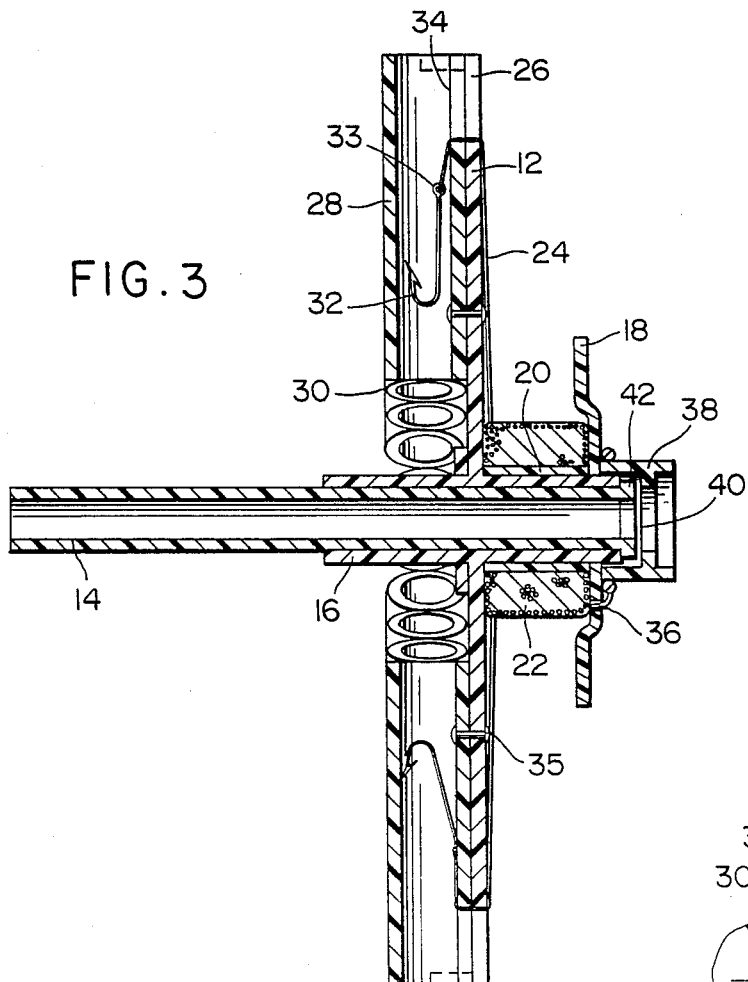
FIG. 3 is a vertical, sectional view, on an enlarged scale, taken substantially upon a passing along section line 3—3 on FIG. 1 illustrating structural details of the storage reel.
Figure 4:
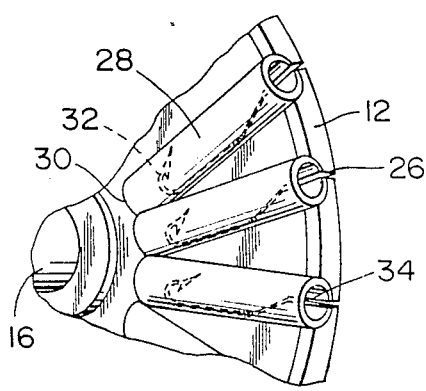
FIG. 4 is a fragmental, perspective view of a plurality of cages mounted on the disc.

Attached to the side of the disc 12 opposite the disc 18 is a plurality of radially disposed, circumferentially spaced tubular member or cages 28 constructed of plastic material or the like and provided with an inner end 30 spaced from the hub 16 as illustrated in FIG. 3. The cages 28 each receive a fishhook 32 to which the leader line or string 24 is attached with the outer end of each cage 28 being generally flush with and aligned with the outer periphery of the disc 12 and provided with a slot or notch 34 to receive the leader line 24. The notches 26 and 34 have generally parallel side walls and do not tightly or frictionally grip the leader line 24 which enables the fishhook to be discharged from the cage 28 by gravity when unwinding inasmuch as the leader line 24 from a particular hook 32 is released from the notches 26 and 34 while the trotline 22 is unwinding from the hub. The cages 28 may be secured in place by rivets 35 or can be molded of one-piece plastic material with the disc 12 and the outer end of the cages 28 may be spaced inwardly slightly from the periphery of the disc 12 if desired.

The disc 18 has an aperture 36 therein through which the end of the trotline may be inserted and tied into a knot or tied around the hub 16 to anchor one end of the trotline to the storage reel. The hub 16, discs 12 and 18 and spacer 20 are retained in assembled relation on the shaft 14 by a retaining sleeve 38 that is frictionally mounted on hub 16 with one end engaging disc 18. The outer end portion of sleeve 38 includes an internal rib 40 that has an internal diameter slightly less than and cooperates with an external flange 42 on the end of the shaft 14 to retain the flange 42 between the end of hub 16 and internal rib 40 on the sleeve 38. This enables the components of the reel to rotate on the shaft 14. The inner end of sleeve 38 frictionally engages the disc 18 to assure that the hub 16, disc 12, spacer 20, disc 18 and sleeve 38 rotate as a unit when sleeve 38 is rotated. The sleeve 38 can be removed and assembled in relation to shaft 14 due to the frictional locking engagement resulting from the plastic material from which the reel components are constructed. The sleeve 38 enables one hand to rotate the reel while the other hand is supporting the reel by gripping the shaft or pipe 14 which may be manually gripped or supported in any suitable manner. The sleeve 38 also enables disassembly of the reel and use of a second disc with cages in lieu of disc 18 when storing a longer trotline with more hooks.

Figure 2:
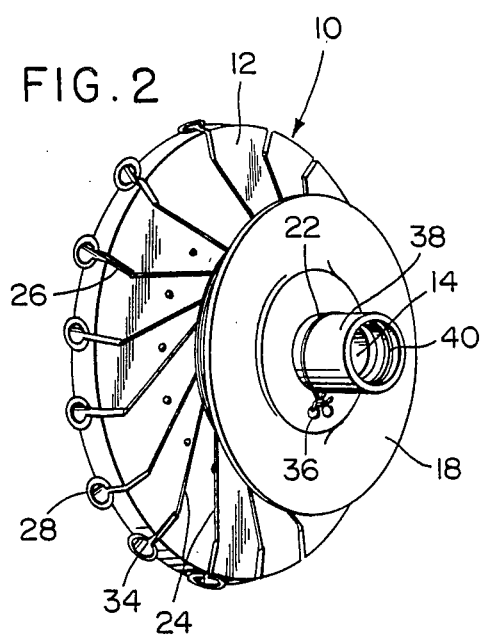
FIG. 2 is a perspective view of the trotline storage reel illustrating the opposite side of the reel.

The pipe or shaft 14 is long enough to accommodate a hand to hold it while the other hand rotates the reel thus enabling the winding operation to be effectively undertaken. The hub 16 extends enough to the left of the disc 12 as illustrated in FIGS. 1 and 2 to facilitate braking of the reel by holding the shaft 14 with the left hand and engaging the end portion of the hub with the thumb or by gripping the shaft 14 and hub 16 in the left hand in order to stop the reel to place the hooks in their cages.

To roll the trotline onto the reel, the leading end of the line is attached to the hub 16 by running the cord through a small hole 36 from the inside out through the disc 18 and then tied around the sleeve 38. The individual cages 28 hold each hook. At the outer end of each cage 28 is a notch or slot 34 that accommodates and receives the hook connecting string or leader line 24. The hook is dropped into its cage and when the eye 33 of the hook is in the cage, the string 26 is pulled down into the notch until the eye 33 is generally flush with the bottom of the slot after which the reel is rotated to roll the trotline by holding the shaft with the left hand and turning the hub with the right hand by turning the sleeve 38. This reeling operation is continued by rotating the reel as in rolling up any cord and as each hook approaches, the reel is stopped when the next hook is the length of its leader from the periphery of the disc 12 and then the hook is pulled to the periphery of the disc and placed in its cage. Then proceed in reeling up the line making sure that the hook leader lines are tight enough to hold the leader string in place without stretching the main trotline. After the trotline has been reeled, the line will be slack between each hook but as rolling continues that slack is covered by the main line so that when the trotline is correctly wound, it will unwind at a brisk pace to the end without tangling. As illustrated, the notches which receive the fish leader lines or strings do not grip the strings and when the hooks are in their cages, the hook eyes 33 are adjacent the inner end of the leader string slots 34. Thus, the reel holds all the hooks in their cages with no points to snag.

The trotline can be baited by using tube-type bait before it is placed on the reel with the tube-type bait received in the cages or preferably the tubes can be filled right on the reel by squeezing the bait in each tube with the squeeze tube in which the bait is supplied. When minnows or other live bait or cut bait is used, the bait would be placed on the trotline before it is placed on the reel. When live bait is used and the trotline is wound on the reel, the entire reel can be submerged in water to keep the bait alive until the trotline is reeled out. The trotline on the reel can be set out from a boat as the boat moves forwardly and the trotline is ready to catch fish as soon as it is set out. The reel including the cages can be varied in size to receive hooks of different sizes and to receive different lengths of trotlines. The cage 28 also is effective for mounting on fishing rods in front of the handle so that the hook can be safely stored without tangling thus enabling the fishing rod to be handled and stored without tangling of the hook and without injury which could occur in the event of contact of the hook with any part of the hands or other part of the human body.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. A trotline storage reel comprising a substantially circular disc having a plurality of radial notches spaced circumferentially around the periphery thereof, a hub for rotatably supporting the disc from a support, said hub including means to receive a trotline being wound thereon with leader lines extending radially of the disc and received in the notches, a plurality of radially disposed, circumferentially spaced cages mounted on the disc on the opposite side from the hub to receive the hooks on the ends of the leader lines, each cage including a notch receiving the leader line with the notch in the cage being aligned with the notch in the periphery of the disc and receiving but not gripping the leader line with the fishhook eye being disposed at the inner end of the notches to enable the fishhooks to fall out of the cages when unwinding the trotline with the leader line of the respective hook being removed from the notches as the trotline is unwound.

2. The structure as defined in claim 1 wherein the hub includes an extension through the disc, a support shaft extending through the hub and extension and rotatably journalling the hub and disc with the cages mounted thereon.

3. The structure as defined in claim 2 wherein said shaft includes a portion capable of manual grasping adjacent the extension on the hub to enable a braking force to be applied to the extension and hub when the reel is to be stopped.

4. The structure as defined in claim 1 wherein said cages have open inner ends spaced radially from said hub and having a length greater than the length of fishhooks received therein to prevent the fishhooks from becoming entangled with the trotline and leader lines.

5. The structure as defined in claim 4 wherein said cages are capable of multiple uses.

6. The structure as defined in claim 1 wherein said hub includes a retaining disc spaced from the notched disc to retain the trotline in the space between the discs.

7. The structure as defined in claim 5 wherein said hub includes a sleeve extending axially from the retaining disc to form a handle for rotating the discs and hub to wind the trotline on the reel.

8. The structure as defined in claim 7 wherein said shaft includes means on the end thereof rotatably retaining the sleeve on the shaft to enable replacement of the retaining disc with a second notched disc with cages thereon to form a double-sized reel to store a longer trotline.

* * * * *